United States Patent
Dai et al.

(10) Patent No.: US 12,554,933 B1
(45) Date of Patent: Feb. 17, 2026

(54) MODALITY SELECTION FOR RESPONDING TO PROMPTS

(71) Applicant: Zoom Communications, Inc., San Jose, CA (US)

(72) Inventors: Wei Dai, Hangzhou (CN); Maikl Adly Abdel-Malek Eskander, Seattle, WA (US); Chensi Mao, Hangzhou (CN); Yang Sun, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 229 days.

(21) Appl. No.: 18/451,485

(22) Filed: Aug. 17, 2023

(51) Int. Cl.
*G06F 40/30* (2020.01)
*G06F 40/40* (2020.01)
*G06N 3/0455* (2023.01)

(52) U.S. Cl.
CPC .............. *G06F 40/30* (2020.01); *G06F 40/40* (2020.01); *G06N 3/0455* (2023.01)

(58) Field of Classification Search
CPC ........ G06F 40/30; G06F 40/40; G06N 3/0455
See application file for complete search history.

(56) References Cited

U.S. PATENT DOCUMENTS

| | | | |
|---|---|---|---|
| 11,256,733 B2 * | 2/2022 | Cannon | G06Q 30/0631 |
| 2021/0174162 A1 | 6/2021 | Le et al. | |
| 2021/0390418 A1 | 12/2021 | Mass et al. | |
| 2022/0028371 A1 | 1/2022 | Xu et al. | |
| 2023/0215422 A1 * | 7/2023 | Carbune | G06N 3/09 |
| | | | 704/251 |

* cited by examiner

*Primary Examiner* — Linda Wong
(74) *Attorney, Agent, or Firm* — Young Basile Hanlon & MacFarlane, P.C.

(57) ABSTRACT

A server obtains a prompt from a user device. The server determines a score representing a likelihood that the prompt matches an intent. The server selects, based on the score, a modality to generate a response to the prompt. The modality is selected from a group comprising a workflow for the intent and a generative pretrained transformer engine. The server generates the response using the modality. The server transmits the response to the user device.

20 Claims, 9 Drawing Sheets

MODALITY SELECTION FOR RESPONDING TO PROMPTS

FIELD

This disclosure relates to modality selection for responding to prompts. For example, a contact center server may select between using a predefined workflow and using a natural language processing technique to respond to a user-provided prompt.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
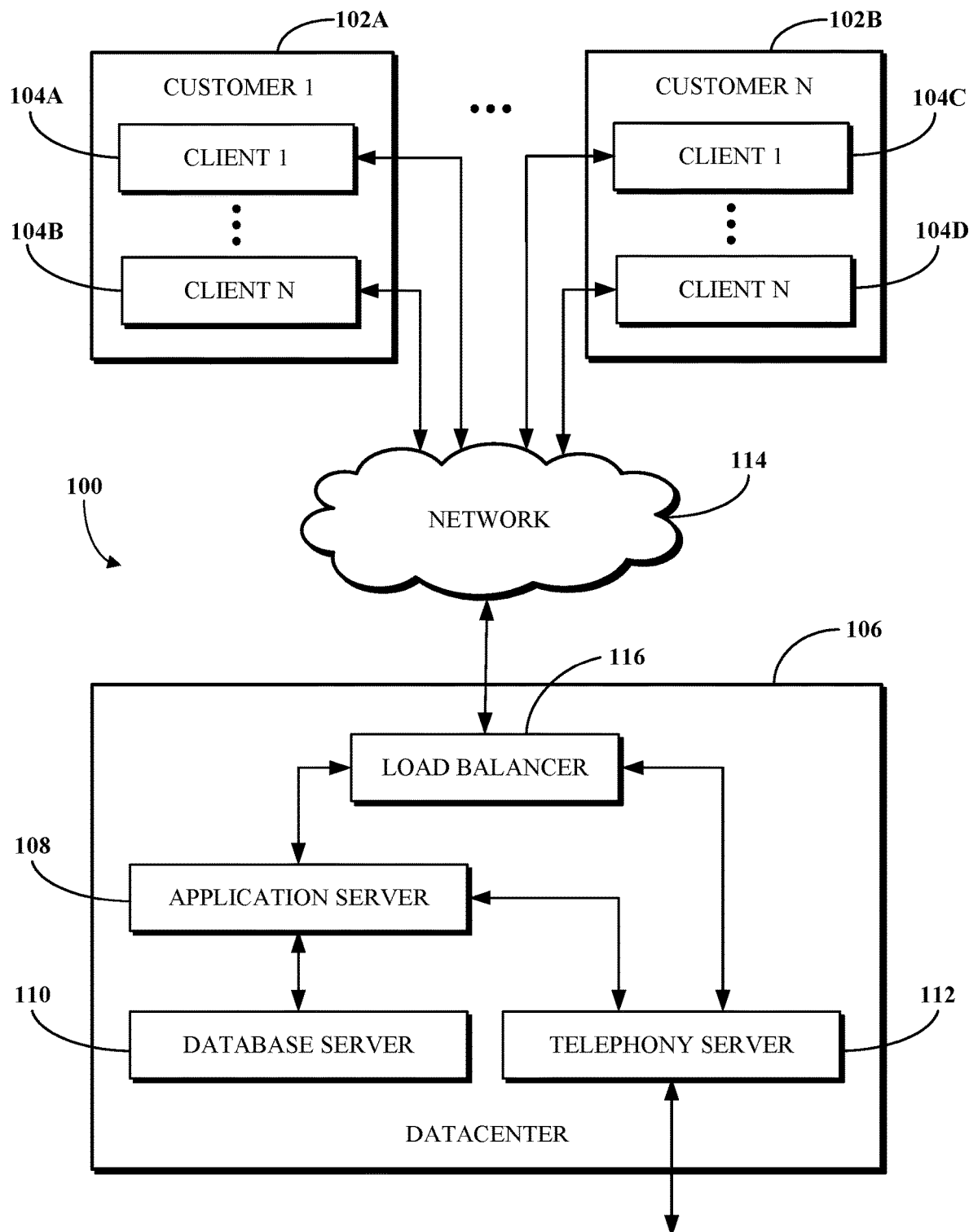
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform or a contact center as a service (CCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

In some cases, an entity operating a contact center may hire human agents to respond to user prompts. Human agents may be very skilled at responding to user prompts. However, in some markets where contact centers operate, labor costs may be high or labor shortages may make it difficult to hire qualified human agents even when funding is available.

To address these labor costs or labor shortages, some contact centers have started using generative pretrained transformer (GPT) engines (or other natural language processing (NLP) engines) for processing user prompts that are typed or spoken by a user in a natural language (e.g., English or Chinese). However, using the GPT engine has the problems of cost and latency. The cost (e.g., in terms of computing resources, electricity, and network bandwidth) of processing each prompt is low. However, when thousands or millions of users access contact centers with different prompts, the total cost becomes very high. Also, the GPT engine typically has a latency of several seconds between when a prompt is provided and when the response is generated. This is much slower than the pace of human speech (or human written communication in a text-based chat) and reduces the quality of the experience of the contact center user. Improving the cost and latency of automated prompt processing in the contact center space is desirable.

Implementations of the disclosed technology address the problem of improving the cost and latency of automated prompt processing in the contact center space. Some implementations couple an intent matching engine (which matches a prompt to an intent, and then causes execution of a workflow corresponding to the intent) with the GPT engine that is configured to generate natural language responses to natural language prompts in the contact center setting.

A server of a contact center receives a prompt from a user device. The server provides the prompt to a noise removal filter to remove background noise and words that are not relevant to the prompt. The prompt, with the noise removed, is provided to the intent matching engine. The intent matching engine determines if an intent could be matched to the prompt with a confidence score meeting a threshold. If the intent is successfully (e.g., with a probability meeting a threshold) matched, the server provides a workflow for the intent. If the intent is not successfully matched to the prompt, the prompt is provided to the GPT engine for processing. As a result, the total cost of using the GPT engine is reduced because fewer prompts are provided to the GPT engine. For prompts that are successfully matched to an intent, latency is reduced because the intent matching engine operates much faster than the GPT engine.

The GPT engine has access to the probabilities that the prompt matches various intents, which are determined by the intent matching engine. In some cases, the GPT engine determines that the prompt corresponds to an intent. In response, the workflow for the intent is implemented. Furthermore, the intent matching engine is further trained (e.g., using online learning or other techniques for adding training data to an artificial intelligence engine that is already trained) based on the intent that was determined by the GPT engine. In some cases, user feedback is obtained to determine whether the intent matching of the GPT engine is correct and the GPT engine and the intent matching engine are further trained based on the user feedback.

In some cases, the GPT engine accesses the original prompt from the user device in conjunction with the prompt lacking noise output by the noise removal filter. The GPT engine may determine the intent and/or generate a response based on the original prompt as well as the prompt lacking noise. The output of the GPT engine may be used to further train the noise removal filter, thereby improving the effectiveness of the noise removal filter in removing noise. The noise removed by the noise removal filter may include at least one of white noise, background noise, or irrelevant words and phrases in the original prompt.

As used herein, the phase "natural language" may refer to a language spoken or written by humans (e.g., English, Spanish, Japanese, or Korean) that has emerged, evolved, or developed in a natural manner. A natural language may be distinct from a constructed or formal language, which may be used to program a computer or to study logic.

To describe some implementations in greater detail, reference is first made to examples of hardware and software structures used to implement modality selection for responding to prompts. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
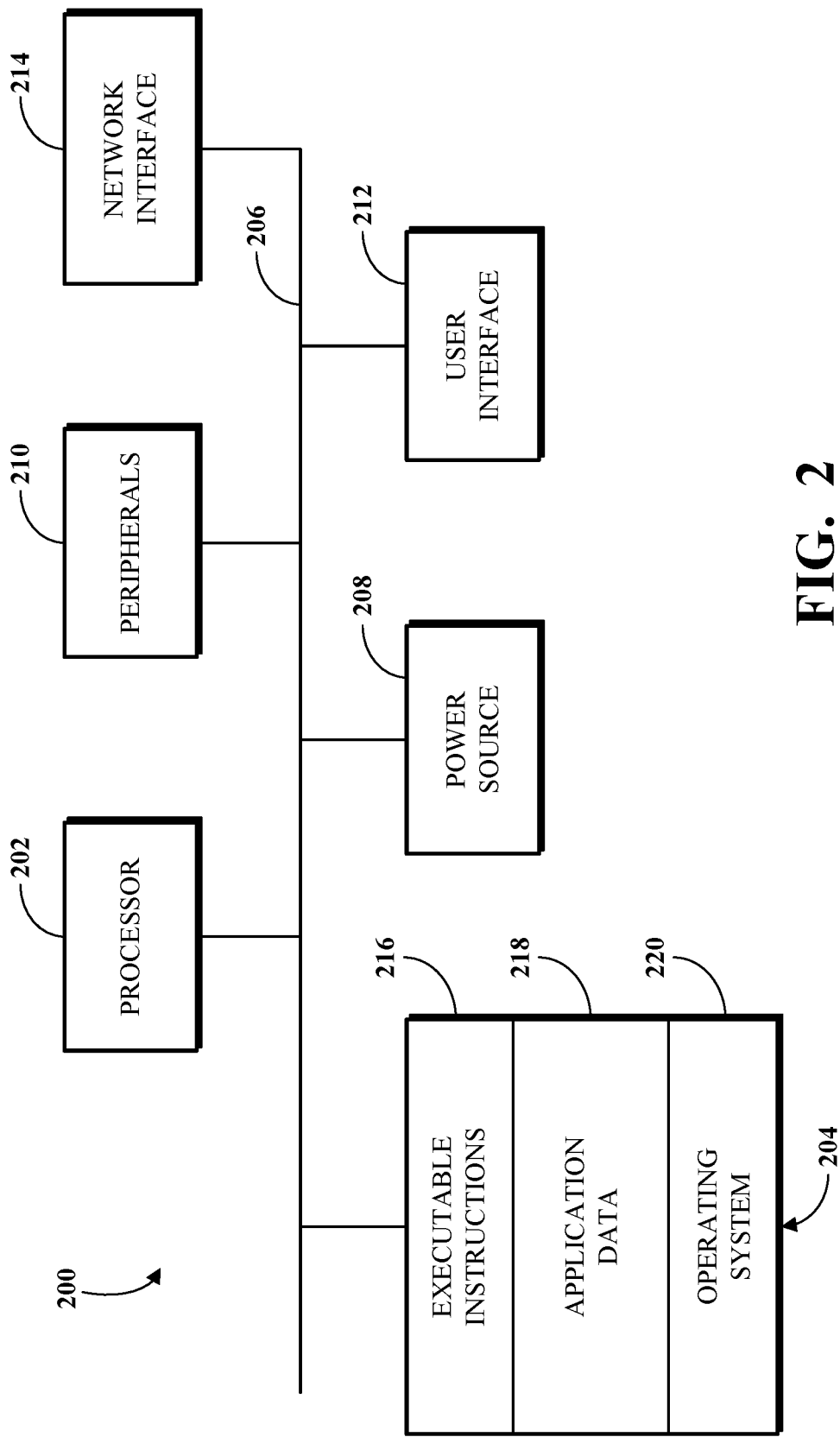
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
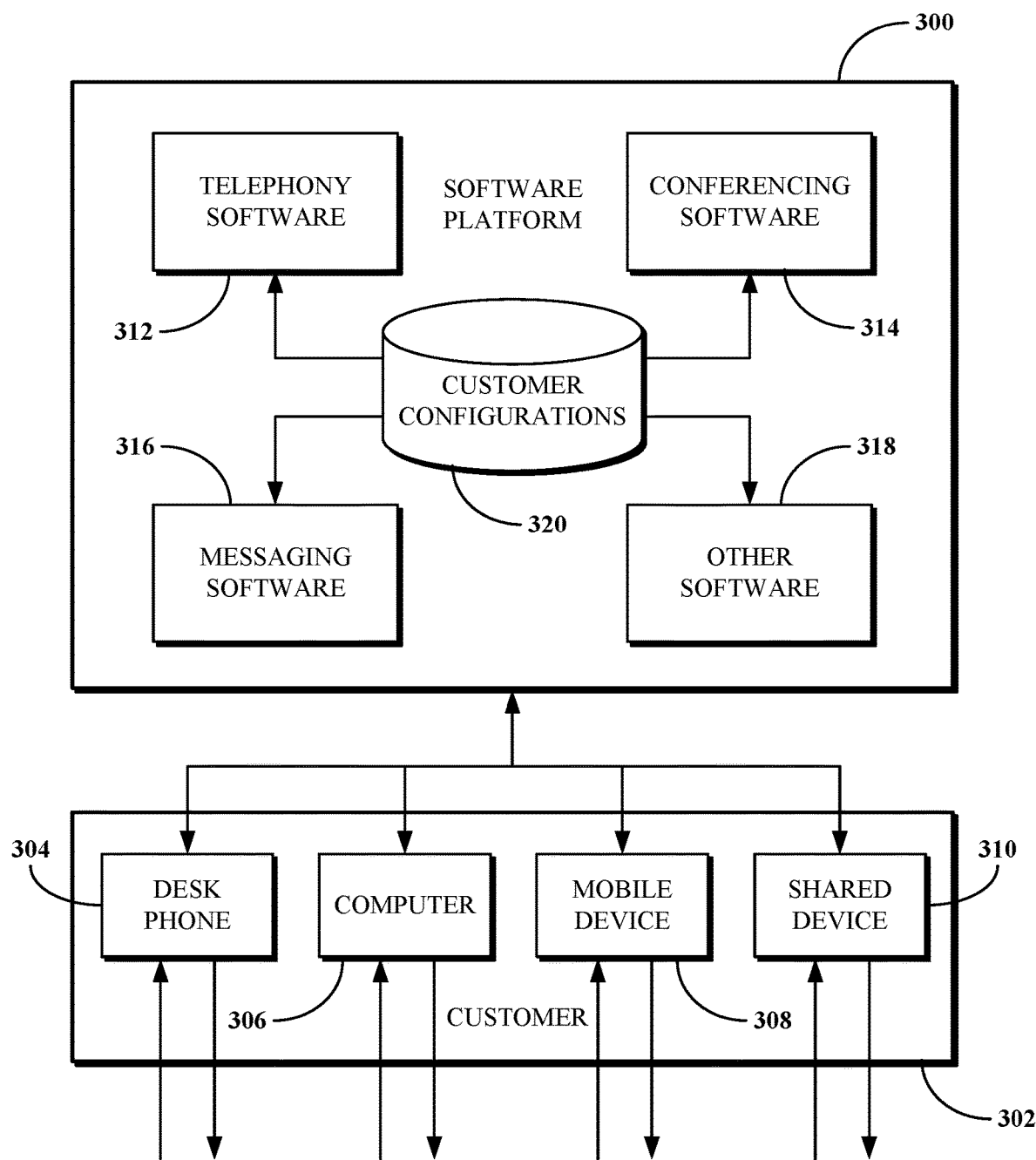
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software (e.g., intent matching software, workflow performing software, or GPT software) for responding to prompts or software for selecting a modality for responding to the prompts.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
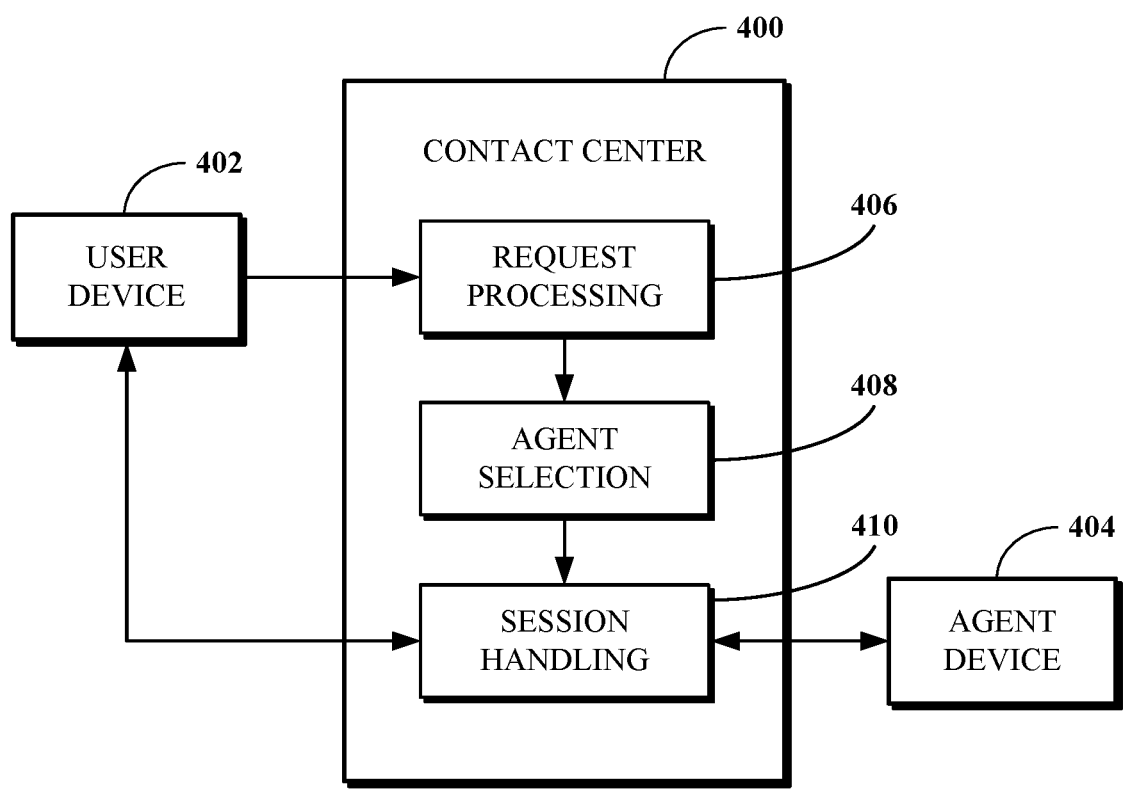
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a7 client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
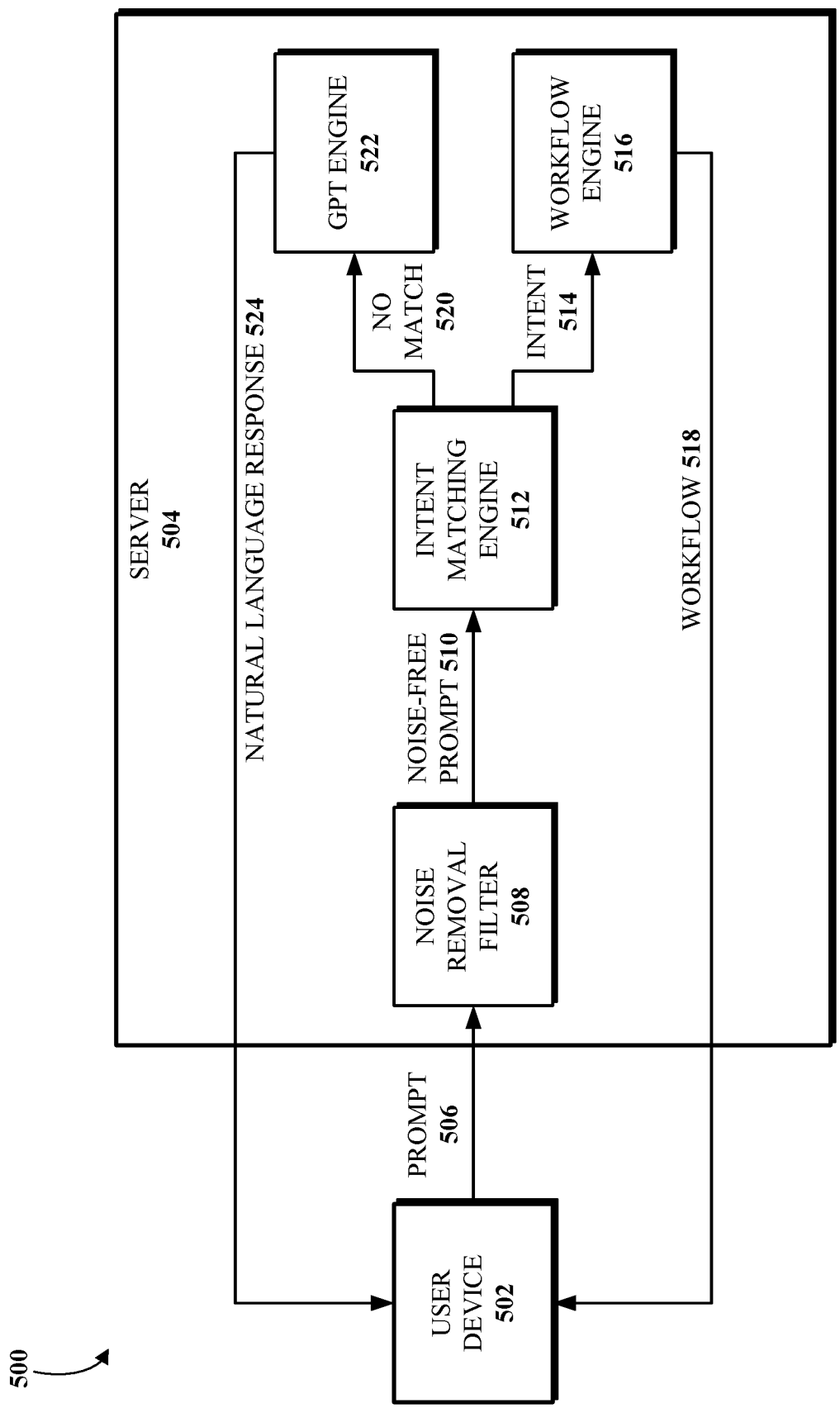
FIG. 5 is a block diagram of an example of a prompt responding system.

FIG. 5 is a block diagram of an example of a prompt responding system 500. As shown, the system 500 includes a user device 502 and a server 504. The user device 502 may correspond to the user device 402 or one of the clients 104A-D or 304-310. The server 504 may be a server of the contact center 400 or may correspond to the application server 108 or the telephony server 112. The user device 502 may include processing circuitry, a memory subsystem, and one or more network interfaces. The server 504 may include processing circuitry, a memory subsystem, and one or more network interfaces. The user device 502 and the server 504 may communicate with one another over one or more networks (e.g., the network 114).

As shown, the user device 502 transmits a prompt 506 to the server 504. The prompt 506 may include text typed via user device 502 or audio or video recorded via the user device 502. At the server 504, the prompt 506 is processed by a noise removal filter 508. The noise removal filter 508 removes noise from the prompt 506 to generate a noise-free prompt 510. If the prompt 506 includes text the noise removal filter 508 may remove any irrelevant text from the prompt 506. For example, if the prompt 506 includes the text, "I want to read my messages and I cannot open my email application," the noise-free prompt 510 may include "cannot open email application." The noise removal filter 508 may leverage rule-based techniques or NLP techniques to remove the irrelevant text. If the prompt 506 includes audio data or video data, the noise removal filter 508 may remove any irrelevant words or phrases from the audio data or the video data, similar to the processing of the text above.

In some case, the prompt 506 may be converted into text as part of the operation of the noise removal filter 508. Alternatively, the noise removal filter may remove any white noise or background noise from the audio data or video data using audio processing techniques. In some cases, video data may be converted into audio data. Alternatively, image processing techniques may be used to detect an emotion of the user in the video data, and the emotion information may be included in the noise-free prompt 510 for further processing. For example, if the user says the phrase, "I want to read my messages and I cannot open my email application," during a video call with the contact center, while making an angry face and with a baby crying in the background, the noise removal filter 508 may generate the noise-free prompt 510 to include the spoken phrase, "cannot open email application," and a text annotation that the user is angry and that the user is in a stressful environment (e.g., caused by the baby crying). This information may be used downstream for generating an appropriate response to the user (e.g., by a GPT engine).

As shown, the noise removal filter 508 provides the noise-free prompt 510 to an intent matching engine 512 of the server 504. The intent matching engine 512 uses natural language processing or rule-based techniques to determine a score representing a likelihood that the noise-free prompt 510 matches an intent 514. The intent 514 is a member of a predetermined set of intents which the server 504 is configured to process, with each intent representing a user goal (e.g., open account, close account, purchase product, return product, or change password) to which multiple prompts can be matched. Each intent maps to a workflow that includes an article or a video for presentation to the user or a series of steps for the server 504 to perform.

If the intent matching engine 512 successfully matches the query to the intent 514 (e.g., with the score meeting the threshold), the intent matching engine 512 transmits the intent 514 to a workflow engine 516 of the server 504. The workflow engine 516 identifies a workflow 518 corresponding to the intent 514 and performs the workflow 518 with the user device 502. For example, if the intent 514 is "change password," the workflow 518 may be an article or a video explaining how to change the password. That article or that video may be transmitted to the user device 502 for display or playback at the user device 502. If the intent 514 is "open checking account," the workflow 518 may include verifying the user's identity, verifying the user's eligibility for a checking account, assigning an account number, and transferring funds for the initial deposit.

If the intent matching engine 512 is not able to successfully match the query to the intent 514 (e.g., no intent has the score meeting the threshold), the intent matching engine 512 transmits the noise-free prompt 510, along with a no match indication 520 to a GPT engine 522 of the server 504.

The GPT engine 522 leverages GPT technology to generate a natural language response 524 to the noise-free prompt 510. The natural language response 524 is transmitted to the user device 502 either as text for display or as audio for playback. In some cases, the audio may be incorporated into a video (e.g., of an avatar moving their mouth and speaking the words in the natural language response 524). As described above, the GPT engine 522 leverages GPT technology to generate the natural language response 524. In alternative implementations, the GPT engine 522 may be replaced with a NLP engine that uses NLP technology different from GPT.

The GPT engine 522 may be trained to generate natural language responses to prompts (e.g., the natural language response 524 to the prompt 506) using any technique or training data for training GPT artificial intelligence technology. In some cases, the GPT engine 522 is trained, at least in part, using data of the contact center 400 to respond to prompts similar to those that were previously provided to the contact center. As a result, the training data resembles the outputs to be generated by the GPT engine 522 in the real world during the inference phase.

In some cases, the GPT engine 522 is trained using a two-phase process including the phases of pre-training and fine-tuning. In the pre-training phase, the GPT engine 522 is trained on a corpus of publicly available text (e.g., from the Internet). The corpus of publicly available text may include text that is distinct from contact center engagements. For example, the corpus of publicly available text may include at least one of newspaper articles, blog posts, publicly available social media post, or encyclopedia articles. The text is used to create a language model that learns to predict the next word in a sentence given the context of the previous words. The Transformer architecture, specifically the self-attention mechanism, is used to capture dependencies between words and create a representation of the text.

During pre-training, the GPT engine 522 learns to generalize the patterns it observes in the training data. Specifically, the GPT engine 522 learns grammar, facts, reasoning abilities, and some level of world knowledge. The pre-training phase allows the GPT engine 522 to acquire a broad understanding of the natural languages in which the GPT engine 522 is trained.

During the fine-tuning phase, after pre-training, the GPT engine 522 is further fine-tuned on specific tasks (e.g., responding to prompts in the context of a contact center) using labeled examples. The labeled examples may include recordings or transcripts of contact center engagements which are ranked (e.g., by human reviewers) according to various qualities (e.g., politeness, empathy, or responsiveness) that are useful in generating "good" contact center responses (e.g., responses that address the user's prompt and provide the user with a positive interactive experience). The fine-tuning phase makes the GPT engine 522 more useful for specific applications, such as responding to prompts provided to the contact center 400. Fine-tuning involves training the GPT engine 522 on a narrower dataset that may be generated with the help of human reviewers.

The fine-tuning phase includes providing prompts or instructions to the GPT engine 522 and receiving responses from the GPT engine 522. The human reviewers review the responses provided by the GPT engine 522 and score the response according to the various qualities. The GPT engine 522 may use reinforcement learning to attempt to improve its scores on each (or at least a subset) of the qualities as the fine-tuning process progresses.

Figure 6:
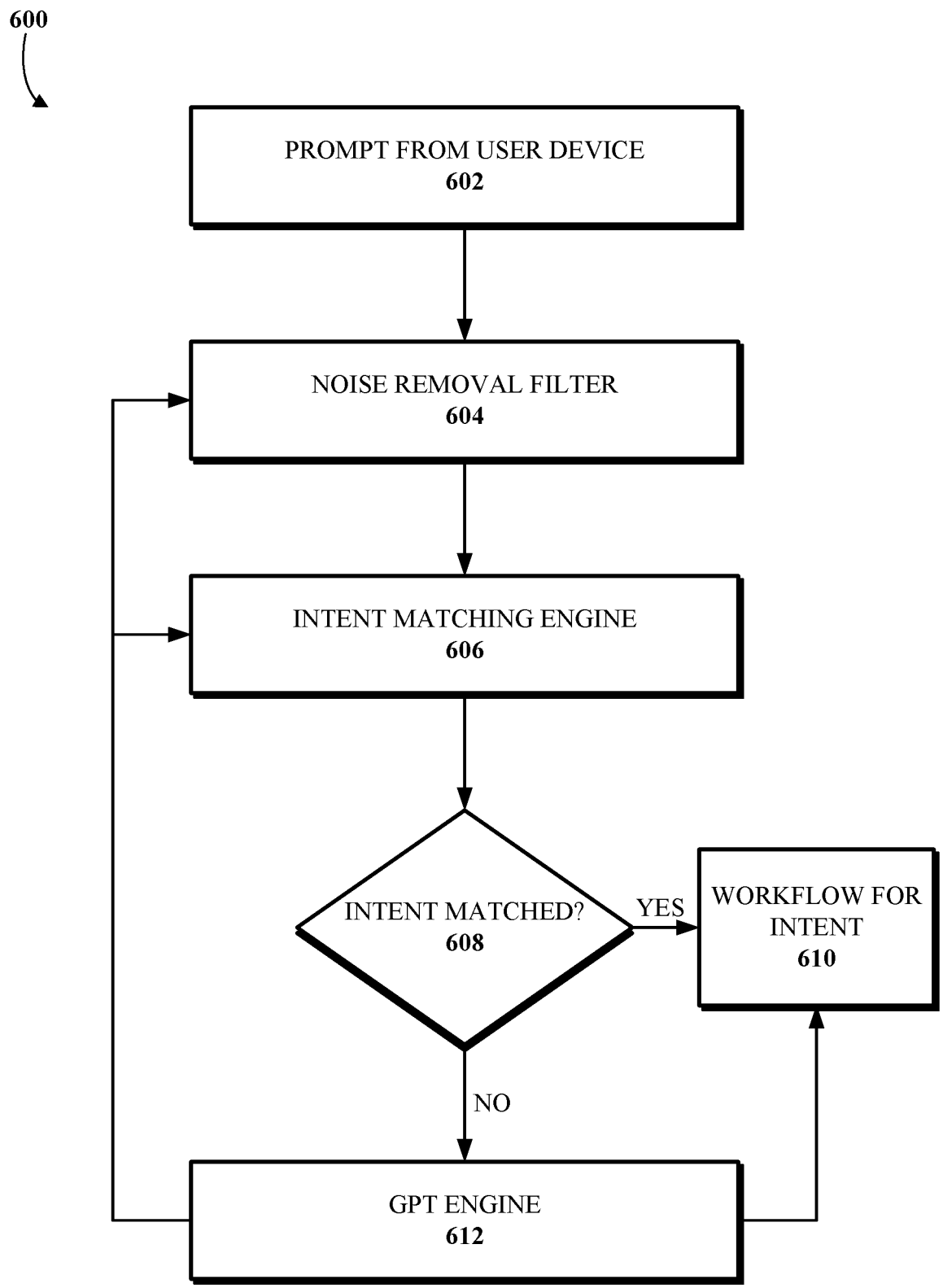
FIG. 6 is a data flow diagram of an example of a system for modality selection for responding to prompts.

FIG. 6 is a data flow diagram of an example of a system 600 for modality selection for responding to prompts. The system 600 may be implemented at the server 504 or at another machine or set of machines.

As shown in FIG. 6, a prompt 602 from a user device is provided to a noise removal filter 604. The prompt 602 may correspond to the prompt 506, and the noise removal filter 604 may correspond to the noise removal filter 508. The noise removal filter 604 removes noise from the prompt 602 and outputs the result to an intent matching engine 606. The intent matching engine 606 may correspond to the intent matching engine 512.

The intent matching engine 606 attempts to match the prompt 602 to an intent and determines whether an intent is matched 608 to the prompt. If so, a workflow 610 for the intent is performed. If not, the prompt 602 is provided to a GPT engine 612. The GPT engine 612 may correspond to the GPT engine 522.

In some cases, the GPT engine 612 provides a natural language output to the user device, as described above. In some cases, the GPT engine 612 determines that the prompt 602 corresponds to an intent for which a workflow is available. In these case, the GPT engine 612 causes one or more computers (e.g., the server 504) to implement the workflow 610 for the matched intent. Furthermore, the matched intent is provided, from the GPT engine 612, to the intent matching engine 606 for further training the intent matching engine 606 using online learning. In some cases, the matched intent is automatically provided to the intent matching engine 606 for training. Alternatively, the matched intent may be provided for training in response to a confirmation, from the user device 502, that the intent matching was correct (e.g., in response to the user confirming that the workflow 610 is a proper response to their prompt or in response to the user performing or participating in actions associated with the workflow.)

The GPT engine 612 may access both the prompt 602 and the output of the noise removal filter 604 which lacks noise. As a result, the GPT engine 612 may determine that the noise removal filter 604 failed to remove irrelevant information or removed relevant information from the prompt 602. The GPT engine 612 may provide this information to the noise removal filter 604 for training. The noise removal filter 604 may be trained, using online learning, based on the output of the GPT engine 612.

Figure 7:
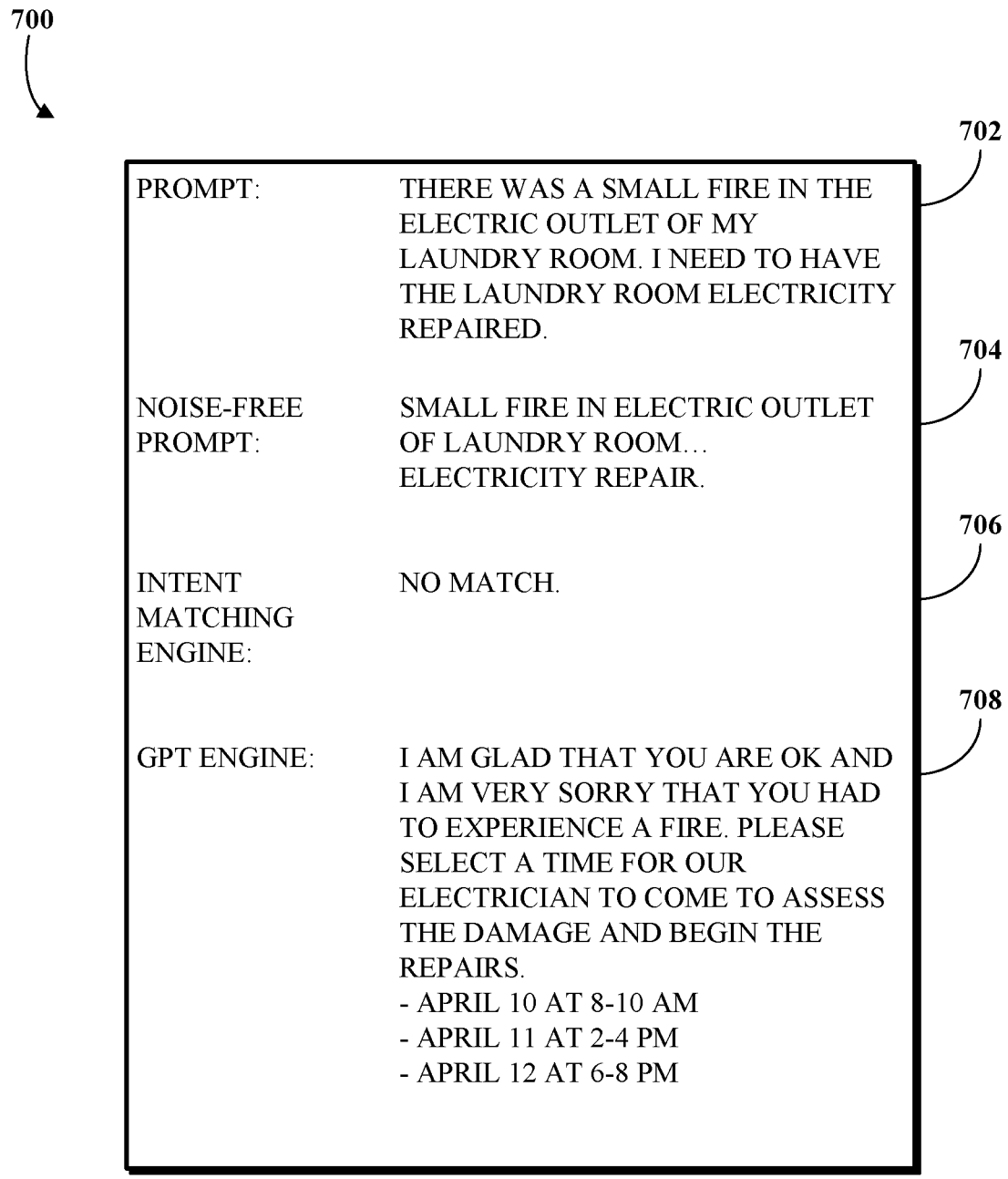
FIG. 7 is a data processing diagram of a first example prompt being processed by a contact center server.

FIG. 7 is a data processing diagram 700 of a first example prompt being processed by a contact center server. As shown in FIG. 7, a prompt 702 is provided from a user device (e.g., the user device 502) to a contact center server (e.g., the server 504). The prompt 702 includes the text, "There was a small fire in the electric outlet of my laundry room. I need to have the laundry room electricity repaired." In alternative implementations, this prompt 702 may be provided in audio format via telephone, audio call, or video call.

The prompt 702 may be provided, for example, to a contact center of a home rental business, a home warranty business, or a home builder. The contact center server uses noise removal techniques (e.g., the noise removal filter 508) to generate the noise-free prompt 704: "small fire in electric outlet of laundry room . . . electricity repair." The noise-free prompt 704, which may correspond to the noise-free prompt 510, is provided to an intent matching engine 706 (e.g., corresponding to the intent matching engine 512) for matching to an intent. The intent matching engine 706 determines that no intent is matched to the noise-free prompt 704. For example, all of the intents may be associated with scores below a threshold. Thus, the noise-free prompt 704 is provided to a GPT engine 708. The GPT engine 708, which may correspond to the GPT engine 522 generates a response to the prompt 702. As illustrated, the response expresses empathy for the user's situation and allows the user to select a time for the electrician to assess the damage and begin the repairs. This response may correspond to the workflow for an intent (e.g., repair request). The intent matched to the noise-free prompt 704 by the GPT engine 708 may be used to further train the intent matching engine 706 using online learning, to cause the intent matching engine 706 to more accurately match prompts to intents in the future.

Figure 8:
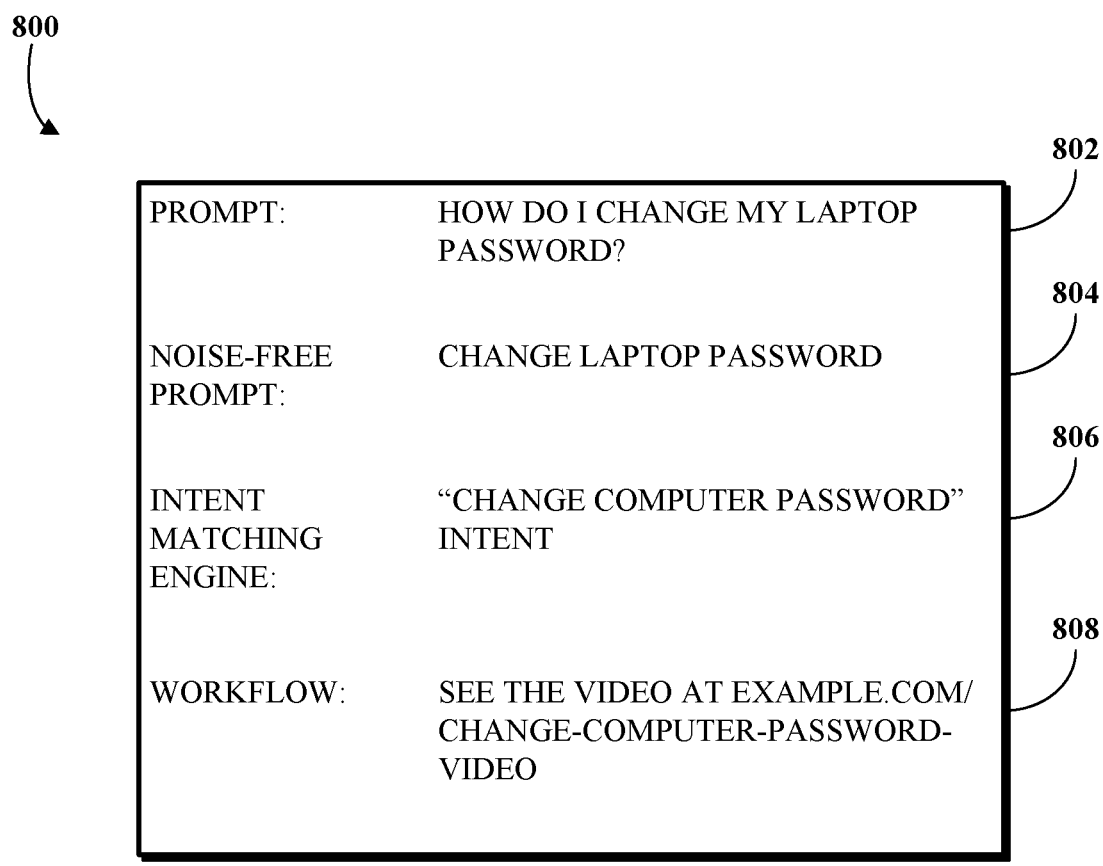
FIG. 8 is a data processing diagram of a second example prompt being processed by a contact center server.

FIG. 8 is a data processing diagram 800 of a second example prompt being processed by a contact center server. As shown in FIG. 8, a prompt 802 is provided from a user device (e.g., the user device 502) to a contact center server (e.g., the server 504). The prompt 802 includes the text, "How do I change my laptop password?" The prompt 802 may be provided, for example, to an information technology contact center or a technical support contact center of a laptop manufacturer. The contact center server uses noise removal techniques (e.g., the noise removal filter 508) to generate the noise-free prompt 804: "change laptop password." The noise-free prompt 804, which may correspond to the noise-free prompt 510, is provided to an intent matching engine (e.g., corresponding to the intent matching engine 512) for matching to an intent. The intent matching engine 806 determines that the noise-free prompt 804 corresponds to the "change computer password" intent. The "change computer password" intent may be associated with a score that exceeds a threshold and exceeds scores assigned to other intents. The "change computer password" intent is mapped to a workflow 808. The server transmits, to the client device that provided the prompt 802, a response associated with the workflow. For example, the server may transmit, to the client device, a message to "see the video at example.com/change-computer-password-video." The user of the client device may then view the video to learn how to change their password.

Figure 9:
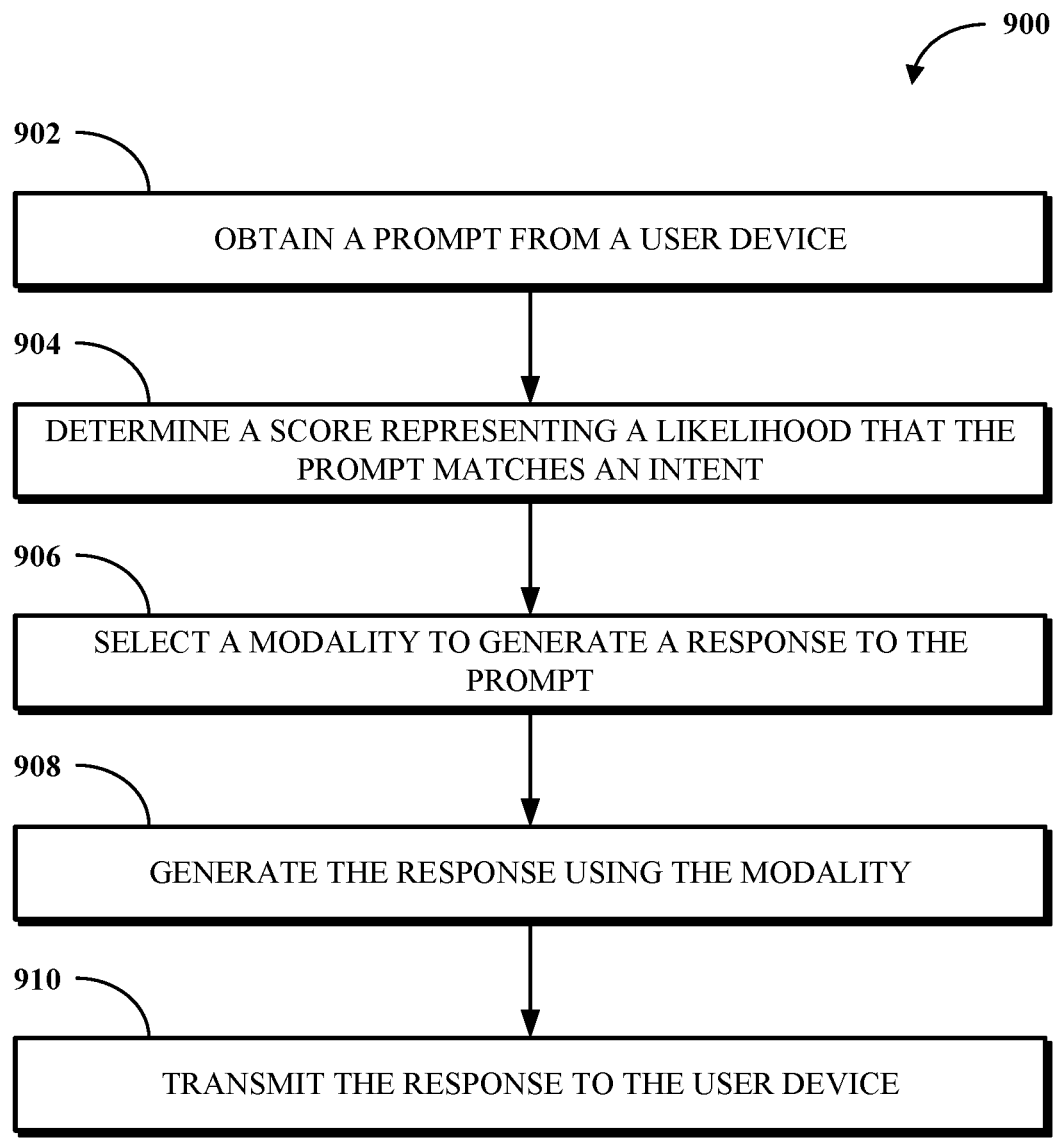
FIG. 9 is a flowchart of an example of a technique for modality selection for responding to prompts.

To further describe some implementations in greater detail, reference is next made to examples of techniques for selecting a modality for responding to contact center prompts. FIG. 9 is a flowchart of an example of a technique 900 for modality selection for responding to prompts. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a server (e.g., the server 504) of a contact center (e.g., the contact center 400) obtains a prompt (e.g., the prompt 506) from a user device (e.g., the user device 502). For example, a user of the user device may contact the contact center (e.g., using at least one of instant messaging, voice calling, and video calling) and may type or speak a prompt for processing by the contact center. The prompt may be typed or spoken in response to a request for the prompt (e.g., the contact center displaying text or playing back audio saying, "How may we help you today?").

At 904, the server determines a score representing a likelihood that the prompt matches an intent. For example, the score may be a probability or a mathematical function of the probability. In some cases, the server determines scores for multiple different intents (e.g., "open account," "close account," "purchase product," "return product," and "change password") and selects the intent having the highest score (or the score associated with the highest probability) for further processing as described below. For example, if the score for "open account" is 0.85 and the score for "close account" is 0.63, then the score for "open account" of 0.85 would be selected for further processing. In some cases, prior to determining the score, the server removes noise from the prompt, so as to ensure that software for determining the score accesses the most relevant parts of the prompt.

At 906, the server selects, based on the score, a modality to generate a response to the prompt. The modality is selected from a group including a workflow for the intent (e.g., the workflow 518) and a GPT engine (e.g., the GPT engine 522). In some cases, the server selects the workflow for the intent responsive to the score meeting a threshold. The server selects the GPT engine responsive to the score (or the highest score if there are multiple scores for multiple intents) not meeting the threshold. The threshold may be a static threshold (e.g., fixed at 0.8). Alternatively, the threshold may be dynamically determined based on the availability of computing resources (e.g., electricity, processing resources, memory resources, or network access resources) to the GPT engine. For example, during peak hours, when the GPT engine has few resources available and there is lots of demand for the GPT engine, the threshold may be set at a low value (e.g., 0.55) to reduce the likelihood of prompts being processed by the GPT engine. During off-peak hours, when the GPT engine has more resources available and there is little demand for the GPT engine, the threshold may be set at a high value (e.g., 0.9) to ensure that only the prompts that are matched to intents with high confidence are processed according to the workflows for those intents. As a result of the dynamic determination, the GPT engine may be optimally used to process prompts without overloading the computing resources of the server.

At 908, the server generates the response using the modality. If the modality is the workflow, the server generates output associated with the workflow. If the modality is the GPT engine, the server generates a natural language response (e.g., the natural language response 524) generated by the GPT engine to the user device. The natural language response may include at least one of text or audio.

At 910, the server transmits the response to the user device. The response may be displayed or played back at the user device. In some cases, the response may include a multi-step process. For example, a workflow for changing a password may include the multiple steps of typing a current password (or otherwise verifying the user's identity), typing a new password, and confirming the new password. If the GPT engine is handling the response to the prompt, the response may involve a multi-step communication, for example, if the user wishes to return a product, the GPT engine may verify that the product is eligible to be returned and provide instructions for packing and shipping the product for return. In some cases, the GPT engine might not be able to immediately determine the user's goals, and might ask the user to clarify their goals or express them in a different manner.

Some implementations are described below as numbered examples (Example 1, 2, 3, etc.). These examples are provided as examples only and do not limit the other implementations disclosed herein.

Example 1 is a method, comprising: obtaining a prompt from a user device; determining a score representing a likelihood that the prompt matches an intent; selecting, based on the score, a modality to generate a response to the prompt, the modality being selected from a group comprising a workflow for the intent and a generative pretrained transformer (GPT) engine; generating the response using the modality; and transmitting the response to the user device.

In Example 2, the subject matter of Example 1 includes, wherein selecting the modality comprises: selecting the workflow for the intent responsive to the score meeting a threshold; or selecting the GPT engine responsive to the score not meeting the threshold.

In Example 3, the subject matter of Examples 1-2 includes, wherein the intent is one of multiple intents, wherein selecting the modality comprises: identifying, from the multiple intents, an intent having a highest score; and selecting the workflow for the intent having the highest score responsive to the highest score meeting a threshold; or selecting the GPT engine responsive to the highest score not meeting the threshold.

In Example 4, the subject matter of Examples 1-3 includes, removing noise from the prompt using a noise removal filter to generate a noise-free prompt, wherein the score is determined based on the noise-free prompt.

In Example 5, the subject matter of Examples 1-4 includes, wherein the score represents a probability that the prompt matches the intent.

In Example 6, the subject matter of Examples 1-5 includes, wherein selecting the modality comprises selecting the GPT engine, the method comprising: matching the prompt to a second intent using the GPT engine; and executing a second workflow corresponding to the second intent.

In Example 7, the subject matter of Examples 1-6 includes, wherein selecting the modality comprises selecting the GPT engine, wherein the score is determined using an intent matching engine, the method comprising: matching the prompt to a second intent using the GPT engine; and training, using online learning, the intent matching engine based on the prompt and the second intent.

In Example 8, the subject matter of Examples 1-7 includes, wherein selecting the modality comprises selecting the GPT engine, the method comprising: removing noise from the prompt using a noise removal engine to generate a noise-free prompt, wherein the score is determined based on the noise-free prompt; and training, using online learning, the noise removal engine based on an output of the GPT engine.

Example 9 is a non-transitory computer readable medium storing instructions operable to cause one or more processors to perform operations comprising: obtaining a prompt from a user device; determining a score representing a likelihood that the prompt matches an intent; selecting, based on the score, a modality to generate a response to the prompt, the modality being selected from a group comprising a workflow for the intent and a generative pretrained transformer (GPT) engine; generating the response using the modality; and transmitting the response to the user device.

In Example 10, the subject matter of Example 9 includes, wherein selecting the modality comprises: selecting the workflow for the intent responsive to the score meeting a threshold.

In Example 11, the subject matter of Examples 9-10 includes, wherein selecting the modality comprises: selecting the GPT engine responsive to the score not meeting a threshold.

In Example 12, the subject matter of Examples 9-11 includes, wherein the intent is one of a plurality of intents, wherein selecting the modality comprises: identifying, from the plurality of intents, an intent having a highest score; and selecting the workflow for the intent having the highest score responsive to the highest score meeting a threshold; or selecting the GPT engine responsive to the highest score not meeting the threshold.

In Example 13, the subject matter of Examples 9-12 includes, the operations comprising: removing noise from the prompt using a noise removal engine to generate a noise-free prompt, wherein the score is determined based on the noise-free prompt.

In Example 14, the subject matter of Examples 9-13 includes, wherein selecting the modality comprises selecting the GPT engine, the operations comprising: matching the prompt to a GPT-identified intent using the GPT engine; and executing a second workflow corresponding to the GPT-identified intent.

In Example 15, the subject matter of Examples 9-14 includes, wherein selecting the modality comprises selecting the GPT engine, the operations comprising: matching the prompt to a second intent using the GPT engine; and training, using online learning and based on the prompt and the second intent, an intent matching engine for determining the score.

In Example 16, the subject matter of Examples 9-15 includes, wherein selecting the modality comprises selecting the GPT engine, the operations comprising: removing noise from the prompt using a noise removal filter to generate a noise-free prompt, wherein the score is determined based on the noise-free prompt; and training the noise removal filter based on an output of the GPT engine.

Example 17 is a system, comprising: a memory subsystem; and processing circuitry configured to execute instructions stored in the memory subsystem to: obtain a prompt from a user device; determine a score representing a likelihood that the prompt matches an intent; select, based on the score, a modality to generate a response to the prompt, the modality being selected from a group comprising a workflow for the intent and a generative pretrained transformer (GPT) engine; generate the response using the modality; and transmit the response to the user device.

In Example 18, the subject matter of Example 17 includes, wherein selecting the modality comprises: selecting the workflow for the intent responsive to the score meeting a threshold; or selecting the GPT engine responsive to the score not meeting the threshold, wherein the threshold is dynamically determined based on availability of computing resources to the GPT engine.

In Example 19, the subject matter of Examples 17-18 includes, wherein the intent is one of multiple intents, wherein selecting the modality comprises: identifying, from the multiple intents, an intent having a score associated with a highest probability of the prompt matching to the intent; and selecting the workflow for the intent having the score associated with the highest probability responsive to the highest score meeting a threshold; or selecting the GPT engine responsive to the score associated with the highest probability not meeting the threshold.

In Example 20, the subject matter of Examples 17-19 includes, removing noise from the prompt using a noise removal filter, wherein the score is determined using the prompt with the noise removed.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   obtaining a prompt from a user device;
   determining a score representing a likelihood that the prompt matches an intent;
   selecting, based on the score not meeting a threshold, a generative pretrained transformer (GPT) engine as a modality to generate a response to the prompt, wherein the modality is selected from a group comprising a workflow for the intent and the GPT engine, and wherein the threshold is dynamically determined based on computing resources available to the GPT engine;
   matching, using the GPT engine, the prompt to a second intent;
   executing a second workflow corresponding to the second intent;
   generating the response using the second workflow; and
   transmitting the response to the user device.

2. The method of claim 1, wherein
   the workflow for the intent is selected as the modality responsive to the score meeting the threshold.

3. The method of claim 1, wherein the intent is one of multiple intents, wherein selecting the GPT engine as the modality comprises:
   identifying, from the multiple intents, an intent having a highest score; and
   selecting the GPT engine responsive to the highest score not meeting the threshold.

4. The method of claim 1, comprising:
   removing noise from the prompt using a noise removal filter to generate a noise-free prompt, wherein the score is determined based on the noise-free prompt.

5. The method of claim 1, wherein the score represents a probability that the prompt matches the intent.

6. The method of claim 1, wherein the score is determined using an intent matching engine, the method further comprising:
   training, using online learning, the intent matching engine based on the prompt and the second intent.

7. The method of claim 1, further comprising:
   removing noise from the prompt using a noise removal engine to generate a noise-free prompt, wherein the score is determined based on the noise-free prompt; and
   training, using online learning, the noise removal engine based on an output of the GPT engine.

8. A non-transitory computer-readable medium storing instructions operable to cause one or more processors to perform operations comprising:
   obtaining a prompt from a user device;
   determining a score representing a likelihood that the prompt matches an intent;
   selecting, based on the score not meeting a threshold, a generative pretrained transformer (GPT) engine as a modality to generate a response to the prompt, wherein the modality is selected from a group comprising a workflow for the intent and the GPT engine, and wherein the threshold is dynamically determined based on computing resources available to the GPT engine;
   matching, using the GPT engine, the prompt to a GPT-identified intent;
   executing a second workflow corresponding to the GPT-identified intent;
   generating the response using the second workflow; and
   transmitting the response to the user device.

9. The non-transitory computer-readable medium of claim 8, wherein
   the workflow for the intent is selected as the modality responsive to the score meeting the threshold.

10. The non-transitory computer-readable medium of claim 8, wherein
    the score represents a probability that the prompt matches the intent.

11. The non-transitory computer-readable medium of claim 8, wherein the intent is one of a plurality of intents, wherein selecting the GPT engine as the modality comprises:
    identifying, from the plurality of intents, an intent having a highest score; and
    selecting the GPT engine responsive to the highest score not meeting the threshold.

12. The non-transitory computer-readable medium of claim 8, the operations comprising:
    removing noise from the prompt using a noise removal engine to generate a noise-free prompt, wherein the score is determined based on the noise-free prompt.

13. The non-transitory computer-readable medium of claim 8, the operations further comprising:
    training, using online learning and based on the prompt and the second intent, an intent matching engine for determining the score.

14. The non-transitory computer-readable medium of claim 8, the operations further comprising:
    removing noise from the prompt using a noise removal filter to generate a noise-free prompt, wherein the score is determined based on the noise-free prompt; and
    training the noise removal filter based on an output of the GPT engine.

15. A system, comprising:
    a memory subsystem; and
    processing circuitry configured to execute instructions stored in the memory subsystem to:
       obtain a prompt from a user device;
       determine a score representing a likelihood that the prompt matches an intent;

select, based on the score, a modality to generate a response to the prompt, the modality being selected from a group comprising a workflow for the intent and a generative pretrained transformer (GPT) engine, wherein to select the modality comprises to:
  select the workflow for the intent responsive to the score meeting a threshold; or
  select the GPT engine responsive to the score not meeting the threshold, wherein the threshold is dynamically determined based on computing resources available to the GPT engine;
generate the response using the modality; and
transmit the response to the user device.

16. The system of claim 15, wherein the intent is one of multiple intents, wherein to select the modality further comprises to:
  identify, from the multiple intents, an intent having a score associated with a highest probability of the prompt matching to the intent.

17. The system of claim 15, wherein the instructions further comprise instructions to:
  remove noise from the prompt using a noise removal filter, wherein the score is determined using the prompt with the noise removed.

18. The system of claim 17, wherein the instructions further comprise instructions to:
  train, using online learning, the noise removal filter based on an output of the GPT engine.

19. The system of claim 15, wherein the score represents a probability that the prompt matches the intent.

20. The system of claim 16, wherein to select the modality further comprises to:
  select the workflow for the intent having the score associated with the highest probability responsive to the score associated with the highest probability meeting the threshold; or
  select the GPT engine responsive to the score associated with the highest probability not meeting the threshold.

* * * * *